United States Patent
Angley et al.

(10) Patent No.: US 6,726,400 B1
(45) Date of Patent: *Apr. 27, 2004

(54) VEHICLE ARRESTING BED SYSTEMS

(75) Inventors: Richard D. Angley, Aston, PA (US); Michael S. Ciesielski, Broomall, PA (US); Christopher T. Dial, Lansdowne, PA (US); Peter T. Mahal, Ardmore, PA (US); Robert F. Cook, Chipley, FL (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,865

(22) Filed: May 19, 2000

Related U.S. Application Data

(60) Continuation of application No. 09/259,730, filed on Mar. 1, 1999, now abandoned, which is a division of application No. 08/796,970, filed on Feb. 7, 1997, now Pat. No. 5,885,025.

(51) Int. Cl.[7] .............................. E01C 5/00; E01C 5/06; E01C 5/08
(52) U.S. Cl. ............................. 404/27; 404/29; 404/71
(58) Field of Search .......................... 404/6, 9, 27, 17, 404/34, 32, 71; 256/13.1; 188/32, 388; 244/110 R

(56) References Cited

U.S. PATENT DOCUMENTS

| | | |
|---|---|---|
| 3,066,896 A | 12/1962 | Schirtzinger |
| 3,867,159 A | 2/1975 | Ergene |
| 3,967,704 A | 7/1976 | Ogden |
| 5,054,954 A * | 10/1991 | Cobb et al. ............ 404/6 |
| 5,063,967 A | 11/1991 | Stevens |
| 5,141,363 A | 8/1992 | Stevens |
| 5,193,764 A | 3/1993 | Larratt |
| 5,241,993 A | 9/1993 | Stevens |
| 5,419,632 A | 5/1995 | Stevens |

FOREIGN PATENT DOCUMENTS

| | | |
|---|---|---|
| GB | 1 092 255 | 11/1967 |
| GB | 1 122 297 | 8/1968 |
| GB | 1 169 415 | 11/1969 |
| GB | 1 449 824 | 9/1976 |

OTHER PUBLICATIONS

Randall, T. G., *Preliminary Feasibility Study of the Arresting of Aircraft in a Foamed Plastic Overrun Area.* (Technical Memorandum Naval 213) Royal Aircraft Establishment, Apr. 1970.

(List continued on next page.)

*Primary Examiner*—Robert E. Pezzuto
*Assistant Examiner*—Raymond W Addie
(74) *Attorney, Agent, or Firm*—Kenneth P. Robinson

(57) ABSTRACT

Vehicle arresting beds, for installation at the ends of aircraft runways, are effective to safely decelerate aircraft entering the bed. The arresting bed is assembled of a large number of blocks of cellular concrete having predetermined compressive gradient strength, so that aircraft landing gear is subjected to drag forces effective to slow a variety of types of aircraft, while providing deceleration within a safe range of values. An arresting bed typically includes an entry region of a depth increasing from 9 to 24 inches formed of blocks having a first compressive gradient strength. A second region, which may be tapered into the first region and increase in depth to 30 inches, is formed of blocks having a greater compressive gradient strength. An aircraft thus experiences increasing drag forces while it travels through the bed, to provide an arresting capability suitable for a variety of aircraft. Arresting bed systems may include composite blocks including portions of cellular concrete of different strengths, reinforced blocks including a lower layer or grid of higher strength material, and cellular concrete block edge members surrounding a bed of aggregate or poured in place cellular concrete.

43 Claims, 5 Drawing Sheets

OTHER PUBLICATIONS

Gwynne, G. M., *Aircraft Arresting Using Foamed Plastic Overrun Area*, (NAD Note No. 282), Royal Aircraft Establishment, Bedford Naval Air Dept., Mar. 1971.

Barnes, J. R., *Development of a Model Technique for Investigating the Performance of Soft Ground Arrestors for Aircraft*, (Technical Report 71231), Royal Aircraft Establishment, Nov. 1971.

Gwynne, G. M., *Use of Foamed Plastics as Emergency Aircraft Arrestors–Study of the Arresting Effects for Different Groups of Aircraft on Selected Runways*, (Technical Memorandum Naval 217), Royal Aircraft Establishment, May 1972.

Gwynne, G. M., *Urea Formaldehyde Foamed Plastic Emergency Arrestors for Civil Aircraft*, (Technical Report 74002), Royal Aircraft Establishment, Feb. 1974.

*Standard Test Method for Compressive Strength of Lightweight Insulating Concrete*, (C495–86), American Society for Testing and Materials, Dec. 1986.

Cook, Robert F., *Soft Ground Arresting Systems*, (Final Report, DOT/FAA/PM–87/27), Universal Energy Systems, Inc., Dayton, OH, Aug. 1987.

Cook, Robert F., *Evaluation of a Foam Arrestor Bed for Aircraft Safety Overrun Areas*, (UDR–TR–88–07), University of Dayton Research Institute, Jan. 1988.

McMichael, Steve and Fisher, Steve, "Understanding Materials with Instrumented Impact", *Mechanical Engineering*, Apr. 1989.

Balaguru, P. and Ramakrishnan, Seetharaman, *Properties of Lightweight Cement Composite Containing Ceramic Spheres*, (Civil Engineering Report No. 92–11), The State University of New Jersey, Rutgers, Nov. 1992.

Cook, Robert F., *Soft Ground Arresting Systems for Commercial Aircraft*, (Interim Report DOT/FAA/CT–TN93/4), Feb. 1993.

White, James C., Agrawal, Satish K., and Cook, Robert F., *Soft Ground Arresting System for Airports*, (Final Report, DOT/FAA/CT–93/80), Dec. 1993.

"Quality Assurance of Batch Mixed Cellular Concrete", Cellufoam Concrete Systems, Dec. 1994.

*Preliminary Soft Ground Arrestor Design for JFK International Airport*, (Draft of Final Report DOT/FAA/CT–95), Mar. 1995.

Brochure: "Mearlcrete Cellular Concrete Production Methods and Equipment", The Mearl Corporation, Sep. 1986.

Brochure: "Structural and Nonstructural Mearlcrete Cellular Concrete Applications and Properties", The Mearl Corporation, Dec. 1987.

Brochure: "Lightweight Cellular Concrete", Anthes Celcon/Anthes Equipment, date unknown.

Brochure: "E–SORB Hollow Sphere Composites for Energy Absorption", Microcel Technology, Inc., date unknown.

Brochure: "Geotechnical Grouting Applications Using Low Density Cellular Concrete", Pacific International Grout Co., date unknown.

Brochure: "Light–Weight Cement Foam Technology", Zementschaum–Technik International GmbH, date unknown.

Brochure: "Light–Weight Foam Technology", Zementschaum–Technik International GmbH, date unknown.

Rivkind, L. E., "Improved Technology for Rigid Inorganic Foams", *Cellular Plastics*, Jul. 1967.

ACI Committee 523, "Guide for Cast–in–Place Low Density Concrete", *ACI Journal*, Sep. 1967.

* cited by examiner

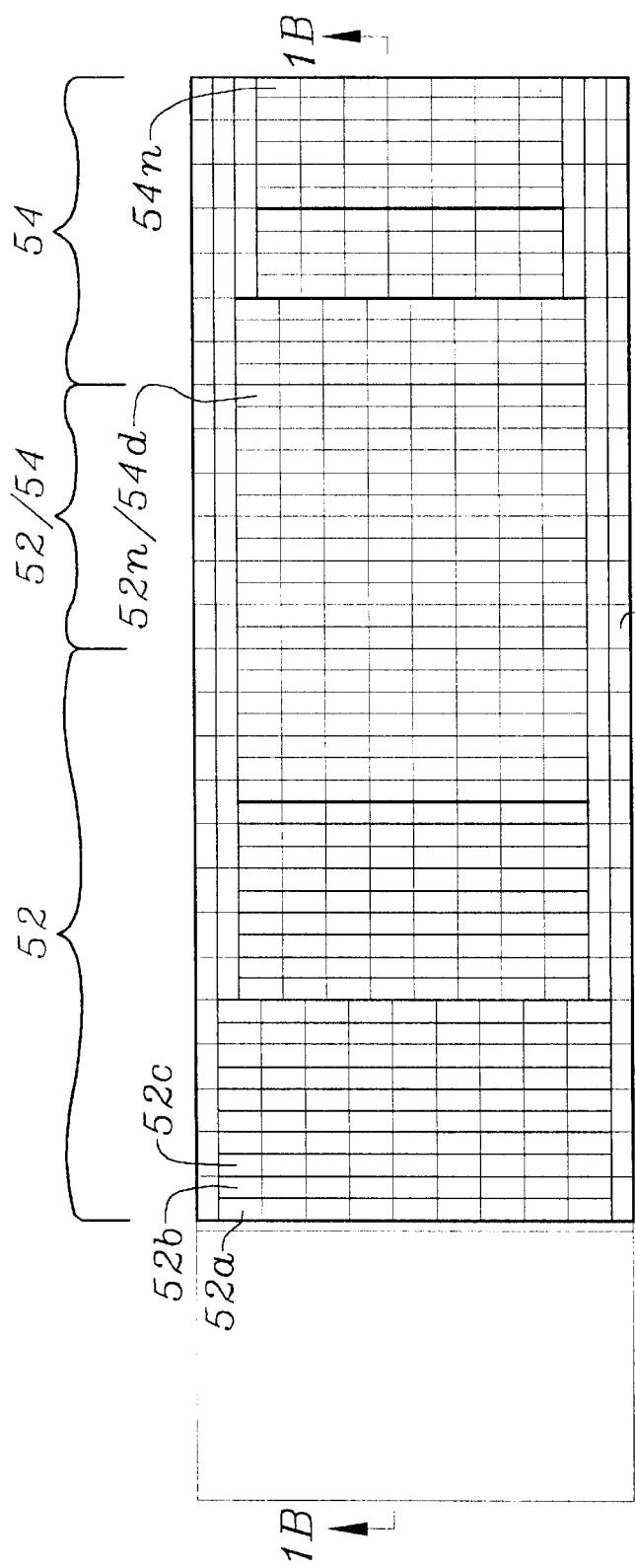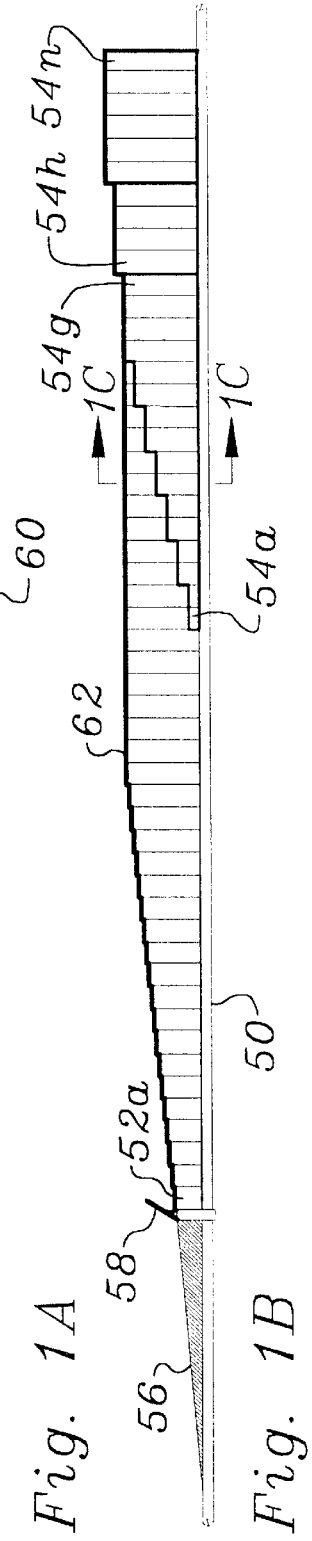

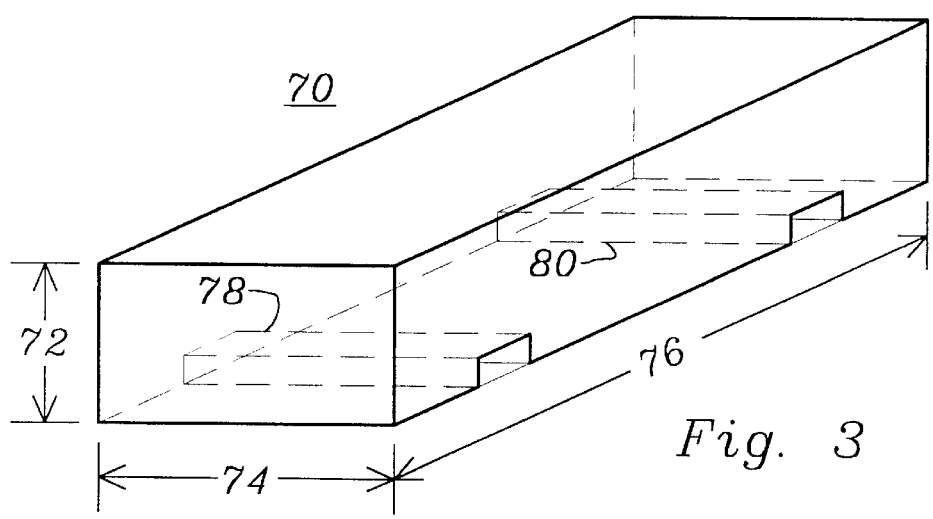
Fig. 3
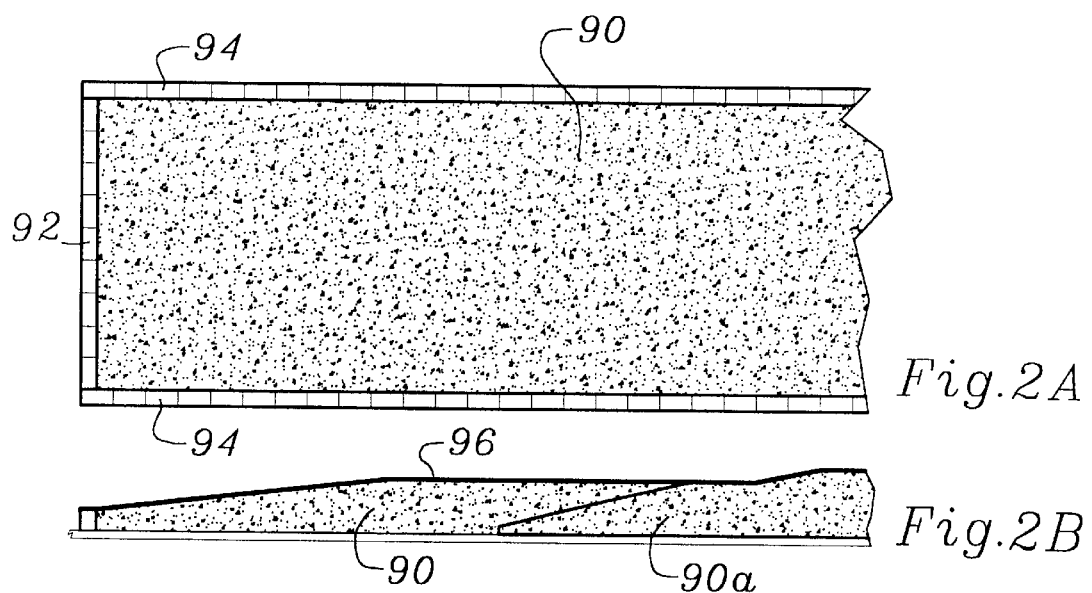
Fig. 2A
Fig. 2B

VEHICLE ARRESTING BED SYSTEMS

RELATED APPLICATIONS

This application is a continuation of application Ser. No. 09/259,730, filed Mar. 1, 1999 now abandoned, which is a division of prior application Ser. No. 08/796,970, filed Feb. 7, 1997, now U.S. Pat. No. 5,885,025.

FEDERALLY SPONSORED RESEARCH (Not Applicable)

BACKGROUND OF THE INVENTION

This invention relates to systems for slowing travel of vehicles and, more particularly, to cellular concrete arresting bed systems to safely decelerate an aircraft which runs off the end of a runway.

Aircraft can and do overrun the ends of runways raising the possibility of injury to passengers and destruction of or severe damage to the aircraft. Such overruns have occurred during aborted take-off or while landing, with the aircraft traveling at speeds to 80 knots. In order to minimize the hazards of overruns, the Federal Aviation Administration (FAA) generally requires a safety area of 1,000 feet in length beyond the end of the runway. Although this safety area is now an FAA standard, many runways across the country were constructed prior to its adoption and are situated such that water, roadways or other obstacles prevent economical compliance with the one thousand foot overrun requirement.

Several materials, including existing soil surfaces beyond the runway have been assessed for their ability to decelerate aircraft. Soil surfaces are very unpredictable in their arresting capability because their properties are unpredictable. For example, very dry clay can be hard and nearly impenetrable, but wet clay can cause aircraft to mire down quickly, cause the landing gear to collapse, and provide a potential for passenger and crew injury as well as greater aircraft damage.

A 1988 report addresses an investigation by the Port Authority of New York and New Jersey on the feasibility of developing a plastic foam arrester for a runway at JFK International Airport. In the report, it is stated that analyses indicated that such an arrester design is feasible and could safely stop a 100,000 pound aircraft overrunning the runway at an exit velocity up to 80 knots and an 820,000 pound aircraft overrunning at an exit velocity up to 60 knots. The report states that performance of an appropriate plastic foam arrester configuration was shown to be potentially "superior to a paved 1,000 foot overrun area, particularly when braking is not effective and reverse thrust is not available." As is well known, effectiveness of braking may be limited under wet or icy surface conditions. (University of Dayton report UDR-TR-a88-07, January 1988.)

More recently, an aircraft arresting system has been described in U.S. Pat. No. 5,193,764 to Larrett et al. In accordance with the disclosure of that patent, an aircraft arresting area is formed by adhering a plurality of stacked thin layers of rigid, friable, fire resistant phenolic foam to each other, with the lower-most layer of foam being adhered to a support surface. The stacked layers are designed so that the compressive resistance of the combined layers of rigid plastic foam is less than the force exerted by the landing gear of any aircraft of the type intended to be arrested when moving into the arresting area from a runway so that the foam is crushed when contacted by the aircraft. The preferred material is phenolic foam used with a compatible adhesive, such as a latex adhesive.

Tests of phenolic foam based arrester systems indicate that while such systems can function to bring aircraft to a stop, the use of the foam material has disadvantages. Major among the disadvantages is the fact that foam, depending upon its properties, can typically exhibit a rebound property. Thus, it was noted in phenolic foam arresting bed testing that some forward thrust was delivered to the wheels of the aircraft as it moved through the foamed material as a result of the rebound of the foam material itself.

Foamed or cellular concrete as a material for use in arresting bed systems has been suggested and undergone limited field testing in the prior art. Such testing has indicated that cellular concrete has good potential for use in arresting bed systems, based on providing many of the same advantages as phenolic foam while avoiding some of phenolic foam's disadvantages. However, the requirements for an accurately controlled crushing strength and material uniformity throughout the arresting bed are critical and, so far as is known, the production of cellular concrete of appropriate characteristics and uniformity has not previously been achieved or described. Production of structural concrete for building purposes is an old art involving relatively simple process steps. Production of cellular concrete, while generally involving simple ingredients, is complicated by the nature and effect of aeration, mixing and hydration aspects, which must be closely specified and accurately controlled if a uniform end product, which is neither too weak nor too strong, is to be provided for present purposes. Discontinuities, including areas of weaker and stronger cellular concrete, may actually cause damage to the vehicle that is being decelerated if, for example, deceleration forces exceed wheel support structure strength. Such non-uniformity also results in an inability to accurately predict deceleration performance and total stopping distance. In one recent feasibility test utilizing commercial grade cellular concrete, an aircraft instrumented for recording of test data taxied through a bed section and load data was acquired. Even though steps had been taken to try to provide production uniformity, samples taken and aircraft load data from the test arresting bed showed significant variations between areas where the crush strength was excessively high and areas where it was excessively low. Obviously, the potential benefit of an arrester system is compromised, if the aircraft is exposed to forces that could damage or collapse the main landing gear.

A 1995 report prepared for the Federal Aviation Administration entitled "Preliminary Soft Ground Arrester Design for JFK International Airport" describes a proposed aircraft arrester. This report discusses the potential for use of either phenolic foam or cellular concrete. As to phenolic foam, reference is made to the disadvantage of a "rebound" characteristic resulting in return of some energy following compression. As to cellular concrete, termed "foamcrete", it is noted that "a constant density (strength parameter) of foamcrete is difficult to maintain" in production. It is indicated that foamcrete appears to be a good candidate for arrester construction, if it can be produced in large quantities with constant density and compressive strengths. Flat plate testing is illustrated and uniform compressive strength values of 60 and 80 psi over a five to eighty percent deformation range are described as objectives based on the level of information then available in the art. The report thus indicates the unavailability of both existing materials having acceptable characteristics and methods for production of such material, and suggests on a somewhat hypothetical basis possible characteristics and testing of such materials should they become available.

Thus, while arresting bed systems have been considered and some actual testing of various materials therefor has been explored, practical production and implementation of an arresting bed system which, within specified distances, will safely decelerate aircraft of known size and weight moving at a projected rate of speed off of a runway, has not been achieved. The particular material to be used, as well as the configuration and fabrication of an arresting bed, are all critical to the provision of an effective arresting bed system. To provide an effective arresting bed for vehicles of a range of sizes, weights and bed entry speeds, requires use of bed designs, materials and fabrication techniques capable of providing predictable drag effects and rates of vehicle deceleration. Computer program models or other techniques may be employed to develop drag or deceleration objectives for arresting beds, based on calculated forces and energy absorption for aircraft of particular size and weight, in view of corresponding landing gear strength specifications for such aircraft. However, such objectives remain merely an abstract goal in the absence of effective bed configurations, materials and fabrication techniques appropriate to convert arresting bed objectives into reality to achieve the desired results. As a result, prior information as to potential arresting bed materials and deceleration objectives has been inadequate to enable fabrication of a practical arresting bed suitable for use by commercial passenger aircraft and other vehicles.

Objects of the invention are, therefore, to provide new and improved vehicle arresting bed systems and such systems having one or more of the following advantages and capabilities:

assembly from pre-cast cellular concrete which has been acceptance tested;

block or aggregate assembly enabling progressive variation of both depth and compressive strength characteristics;

predetermined arresting characteristics, substantially independent of weather conditions;

long-life weather resistant construction;

ability of crash/fire/rescue vehicles to fully maneuver on an arresting bed;

ease of exit by passengers from a vehicle which has entered an arresting bed; and ease of repair by block or aggregate replacement following use by an overrunning vehicle.

SUMMARY OF THE INVENTION

In accordance with the invention, a vehicle arresting bed system includes an initial section including first and second lateral rows of blocks of cellular concrete having a first dry density in the lower portion of a range of 12 to 22 pcf. Blocks of the second row have a height incrementally greater than the height of blocks of the first row. Also, the blocks of the first and second rows have a first compressive gradient strength to provide vehicle deceleration.

The bed system has a further section including third and fourth lateral rows of blocks of cellular concrete having a second dry density greater than the first dry density. Blocks of the fourth row have a height incrementally greater than the height of blocks of the third row and the blocks of the third and fourth rows have a second compressive gradient strength, greater than the first compressive gradient strength, to provide greater vehicle deceleration.

A vehicle arresting bed system may desirably have additional characteristics, such as the following. The blocks are preferably formed of cellular concrete having a wet density in a range of 15 to 23 pcf and cured in forms of predetermined sizes. By way of example, all of the blocks in a preferred embodiment are of the same length and width, but some are of different predetermined heights, with a first section of blocks having a 60/80 compressive gradient strength and a second section of blocks having an 80/100 compressive gradient strength. Each block typically has a predetermined compressive gradient strength over a depth of penetration from 10 to 60 percent of block thickness to provide gradual deceleration of a vehicle.

Bed systems in accordance with the invention may include composite blocks including portions of cellular concrete of different compressive gradient strengths, reinforced blocks including a lower layer grid of higher strength material, and edge members formed of cellular concrete blocks surrounding a bed of aggregate material or poured in place cellular concrete.

For a better understanding of the invention, together with other and further objects, reference is made to the accompanying drawings and the scope of the invention will be pointed out in the accompanying claims.

BRIEF DESCRIPTION OF THE DRAWINGS

FIGS. 1A, 1B and 1C are respectively a plan view, and longitudinal and transverse cross-sectional views, of a vehicle arresting bed system using block construction in accordance with the invention.

FIGS. 2A and 2B are respectively portions of similar plan and longitudinal views of a vehicle arresting bed system using aggregate fabrication in accordance with the invention.

FIG. 3 shows dimensions of a typical block of cellular concrete suitable for use in an arresting bed system.

DETAILED DESCRIPTION OF THE INVENTION

Figure 4:
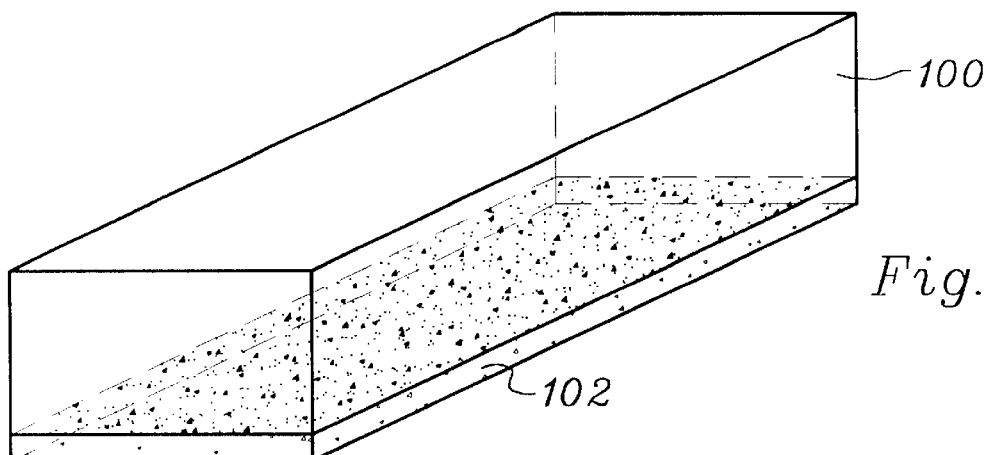
FIGS. 4, 5 and 6 show alternative constructions of cellular concrete blocks.

The use of cellular concrete in arresting bed applications requires the material to be generally uniform in its resistance to deformation since it is the predictability of forces acting on the surface of contacting members of the vehicle which is being stopped that allows the bed to be designed, sized and constructed in a manner which will ensure acceptable performance. In order to obtain such uniformity, there must be careful selection and control of the ingredients used to prepare the cellular concrete, the conditions under which it is processed, and its curing regime.

The ingredients of cellular concrete are generally a cement, preferably Portland cement, a foaming agent, and water. Very fine sand or other materials can also find application in some circumstances, but are not used in presently preferred embodiments. The currently preferred type of cement for arresting bed application is Type III Portland cement. For present purposes, the term "cellular concrete" is used as a generic term covering concrete with relatively small internal cells or bubbles of a fluid, such as air, and which may include sand or other material, as well as formulations not including such sand or other material.

Construction of the arresting bed system can be accomplished by producing the cellular concrete at a central production facility or at the site of the bed and pouring the concrete into forms of appropriate dimensions to achieve the desired geometry for the system. However, in the interests of uniformity of material characteristics and overall quality control, it has currently been found preferable to cast sections of the overall bed using forms of appropriate size and then transport the sections to the site and install them to provide the overall configuration of the bed. In the latter case, such units or sections, in the form of blocks of predetermined sizes, can be produced and held until completion of quality control testing. The blocks can then be placed at the site and adhered to the runway safety area using asphalt, cement grout, or other suitable adhesive material, depending on the construction materials of the safety area itself.

In either case, in accordance with the invention a hardcoat is applied to the outer surface of the assembled arresting bed to provide a stronger surface that is not as easily deformed as the major structure of the bed itself. This allows maintenance to be performed without serious deformation damage to the main structure. A preferred hardcoat consists of foamed concrete wherein the wet densities are somewhat higher, for example in the range of about 22 to about 26 lbs./cu. ft. Finally a weather resistant protective film or paint can be applied to give the structure a desired visual appearance and act as protection against weather degradation. Preferred coatings include water based silicone materials.

Definition of "Compressive Gradient Strength" or "CGS"

The term "compressive strength" (not CGS) is normally understood to mean the amount of force (conventionally measured in pounds per square inch) which, when applied at a vector normal to the surface of a standardized sample, will cause the sample to fail. Most conventional test methods specify test apparatus, sampling procedures, test specimen requirements (including size, molding, and curing requirements) rates of loading and record keeping requirements. An example is ASTM C 495-86 "Standard Method for Compressive Strength of Lightweight Insulating Concrete." While such conventional test methods are useful when designing structures that are required to maintain structural integrity under predicted load conditions (i.e., have at least a minimum strength), the object of arresting bed systems is to fail in predictable specified manner, thereby providing controlled, predictable resistive force as the vehicle deforms the cellular concrete (i.e., a specific compressive gradient strength). Thus, such conventional testing focuses on determining strength up to point of failure, not strength during compressive failure. Stated more simply, knowing what amount of force will shatter a specimen of cellular concrete material does not answer the critical question of what amount of drag or deceleration will be experienced by a vehicle moving through an arresting bed system. In contrast to a "one time" fracture strength as in the prior art, for present purposes testing must evaluate a continuous compressive failure mode as a portion of a specimen is continuously compressed to about twenty percent of its original thickness. Equipment and methods suitable for such continuous testing as appropriate for present purposes have generally not been previously available.

Because of the wide range of variables available in materials and processing of cellular concretes, and the size and cost of constructing arresting beds for testing, it is imperative that accurate test information be available to predict the amount of resistive force a particular variety of cellular concrete, processed and cured in a certain way, will provide when used in an arresting bed system. By developing new test methodology to focus the resulting data on measurement of the resistive force occurring during continuous compressive failure of a sample, instead of simple one-time "compressive strength", new test methods and apparatus have been developed to enable reliable testing and confirmation of appropriate cellular concrete materials and process variables.

As a result it has been determined that the compressive force needed to crush cellular concrete to 20 percent of its original thickness varies with the depth of penetration. This characteristic, which the present inventors term "compressive gradient strength" or "CGS" must be accurately specified in order to construct a cellular concrete vehicle arresting bed having known deceleration characteristics to safely decelerate an aircraft. Thus, a penetration type test method where the compressive strength of a sample of cellular concrete is gauged not by applying a force that will fracture a sample, but rather will continuously provide data on resistive forces generated as a test probe head having a specified compressive contact surface is moved through a volume of cellular concrete, is key to obtaining the data necessary to formulate and use cellular concrete in arresting bed applications. As thus measured, CGS will vary over a range with penetration depth, resulting in a gradient value (such as 60/80 CGS with an average CGS of 70 psi over the penetration range) rather than a simple singular fracture value as in prior tests.

For present purposes, the term "compressive gradient strength" (or "CGS") is used to refer to the compressive strength of a section of cellular concrete from a surface and continuing to an internal depth of penetration, which may typically be 66 percent of the thickness of the section. As defined, CGS does not correspond to compressive strength as determined by standard ASTM test methods. Test methods and apparatus suitable for determining CGS are disclosed in U.S. Pat. No. 5,789,681, issued Aug. 4, 1998, the disclosure of which is hereby incorporated herein by reference.

Arresting Bed of FIGS. 1A, 1B and 1C

With reference to FIG. 1 (collectively including FIGS. 1A, 1B and 1C), there is illustrated an embodiment of a vehicle arresting bed system in accordance with the invention. As shown in FIG. 1A, the bed has a length and width and also a thickness as shown in FIGS. 1B and 1C. The bed is configured to decelerate an aircraft entering the bed from the left in FIG. 1A. Basically, the FIG. 1 system is constructed of pre-cast blocks of cellular concrete having two different compressive gradient strengths and a variety of different thicknesses, with intended installation at the end of an airport runway. Subsurface 50 supporting the system should typically be relatively flat, smooth and level (subject to having a slope appropriate for water runoff requirements) and capable of supporting aircraft which leave the runway. Subsurface 50 should be in good condition and cleaned satisfactorily for placement and bonding of the arresting bed system. To show vertical details, the vertical dimensions of FIGS. 1B and 1C are expanded relative to the dimensions of FIG. 1A (e.g., the width of the bed in FIG. 1A may typically be 150 feet, while the maximum thickness of the bed in FIGS. 1B and 1C may typically be 30 inches). Also, certain dimensions, such as block size, are distorted for clarity of illustration (e.g., rather than show the thousands of blocks actually included in a typical arresting bed).

A typical block suitable for use in the FIG. 1 system is illustrated in FIG. 3. As shown, block 70 may be fabricated by placing wet cellular concrete in curing forms of uniform width 74 (typically 4 feet) and length 76 (typically 8 feet). Block thickness 72 may be varied in a range of 8 to 30 inches, for example, to provide blocks having heights varying in increments (typically of from ¾ inch increments of height for a fine taper to increments of 3 inches) in order to enable provision of front to rear tapered bed configurations able to provide predetermined incremental increases in drag forces. In the block embodiment shown in FIG. 3, there are included transverse lifting slots 78 and 80. Slots 78 and 80, suitable for use with a fork lift type of lifting mechanism, are formed by placing lightweight rectangular plastic sleeves in the bottom of a form when casting the block. Other block features and embodiments usable in arresting beds constructed in accordance with the invention will be discussed with reference to FIGS. 4, 5 and 6.

As shown, the FIG. 1 vehicle arresting bed system has a bed area of cellular concrete which includes a first section 52, comprising an assembly of blocks having a first CGS and a first dry density, and a second section 54, comprising an assembly of blocks having a second CGS and a second dry density. As shown in the side sectional view of FIG. 1B, sections 52 and 54 partially overlap (in what might be considered section 52/54), with a darkened line indicating the juncture wherein certain blocks of section 52 overlie blocks of section 54 in a transition region. In a particular embodiment, the section 52/54 blocks may actually be composite blocks (i.e., single blocks including a 52 portion having a first CGS and also a 54 portion having a second CGS). In other embodiments separate blocks of different CGS may be stacked for section 52/54.

Figure 7:
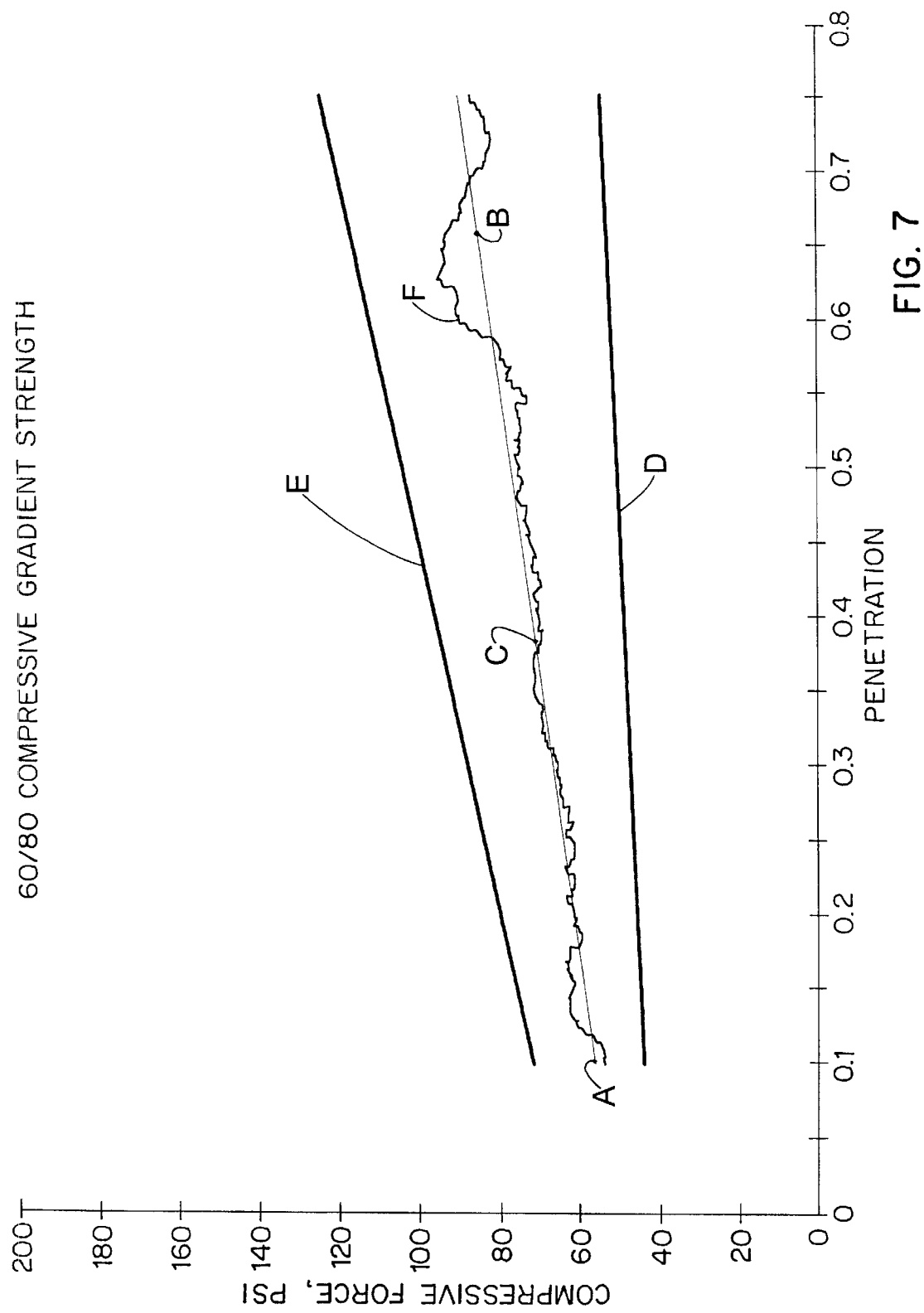
FIGS. 7 and 8 show test results in terms of compressive force versus percentage of penetration for samples of cellular concrete of two different strengths.

More particularly, vehicle arresting bed systems of the type illustrated in FIG. 1 include a first lateral row of blocks (e.g., row 52a) of cellular concrete having a first CGS and a first dry density in a range of 13 to 18.5 pounds per cubic foot (pcf). Each of the blocks in first row 52a has a first height and is fabricated to be vertically compressible to a compressed height (e.g., typically compressible to about 20 percent of initial thickness). These blocks may be fabricated to exhibit a 60/80 CGS characteristic as represented in FIG. 7, which will be discussed below. As shown in FIGS. 1A and 1B, the first section 52 includes a second row 52b and a plurality of additional lateral rows illustrated as rows 52c through 52n, formed of cellular concrete having the same basic characteristics as in the blocks of row 52a, but some of which differ row-to-row by an incremental height differential. Also, as discussed with reference to overlap section 52/54 certain rows of blocks, such as row 52n, overlay blocks of row 54d on a composite block or stacked block basis. In this embodiment successive ¾ inch changes in thickness were utilized in section 52 to provide tapered or sloping characteristics resulting in gradually increasing vehicle arresting capabilities. Corresponding 3 inch changes in thickness were utilized in Section 54, in this particular design.

Figure 8:
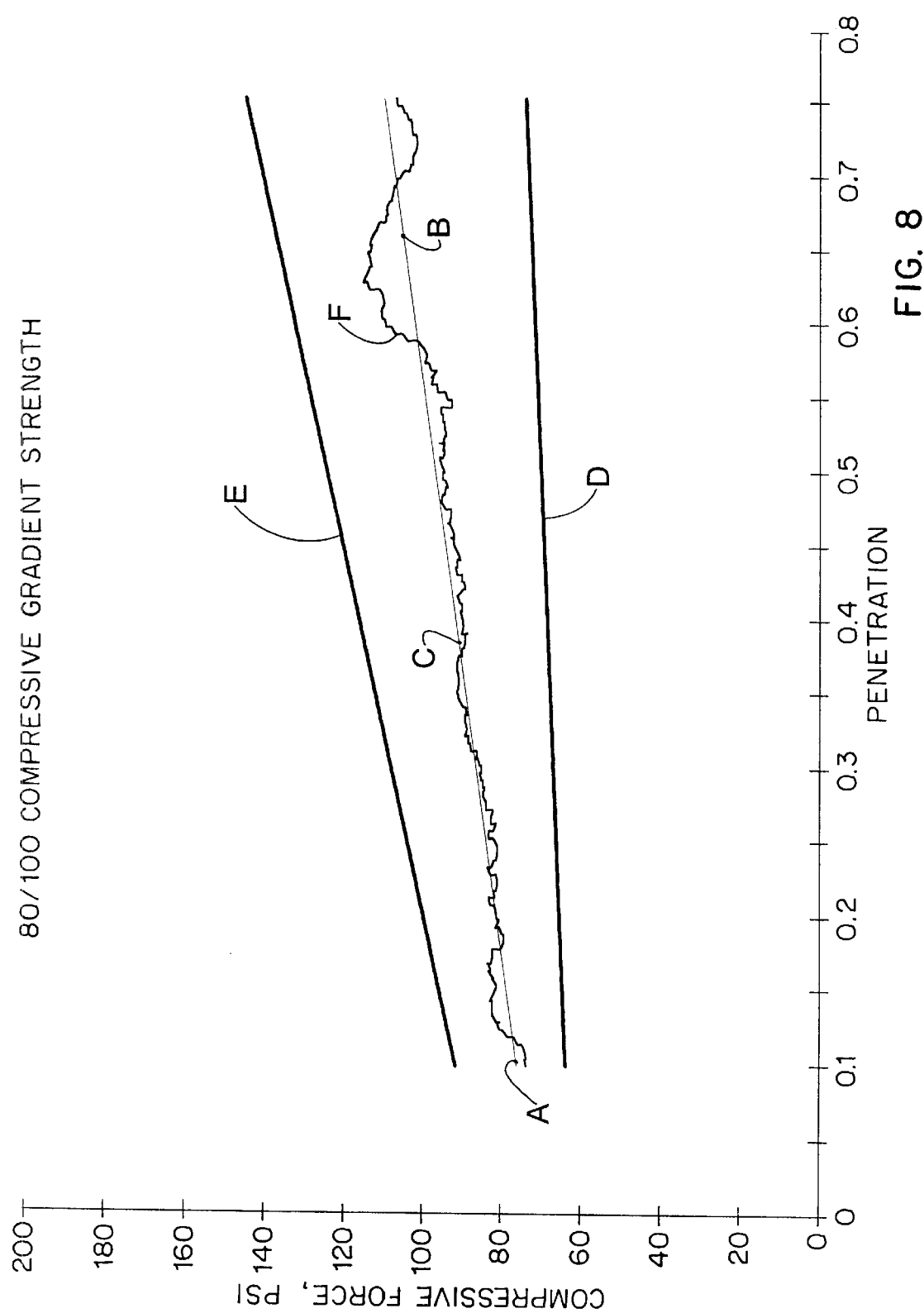

Arresting bed systems of the type illustrated also include a third lateral row 54g of blocks of cellular concrete having a second dry density which may be at a higher level in the same range as the first blocks in section 52. As shown, lateral row 54g is positioned parallel to and to the rear of the first lateral row 52a. Row 54g is in turn followed by a lateral row 54h of incrementally greater height. The blocks of section 54 are fabricated to be vertically compressible subject to a second compressive gradient strength, which will generally be specified to exceed the CGS of the blocks of section 52. These blocks may be fabricated to exhibit a 80/100 CGS characteristic, as represented in FIG. 8 which will be discussed below, and a dry density in a range of 16 to 21.5 pcf. In the illustrated embodiment the first row of blocks 54a of section 54 includes only a single course or layer of the second CGS. Successive rows of section 54 include increasing thickness of the second CGS material, until the section 54 blocks reach the full height of the arresting bed beyond section 52. Successive rows of section 54 then increase in thickness by 3 inch increments in advance of reaching maximum height in a rear level portion comprising rows of the same thickness continuing to final rear row 54n. Rows of increased height, such as row 54n, may be formed of two or three superimposed blocks of reduced thickness or of rows of single relatively thick blocks, depending upon fabrication, handling and site delivery considerations.

FIG. 7 illustrates the CGS characteristics of a cellular concrete sample representative of a block from section 52 of FIG. 1, as determined by test. In FIG. 7, the bottom scale represents percentage of test probe penetration expressed in tenths of sample thickness or height. The vertical scale represents test probe compressive force expressed in pounds per square inch (psi). The test data of principal interest is typically within the range of penetration from 10 to 60 percent of sample thickness. Data outside this range may be less reliable, with crushed material build-up effects occurring beyond about 70 percent penetration.

As illustrated in FIG. 7, the failure strength of cellular concrete exhibits a gradient with resistance to compression increasing with depth of penetration. For a particular design of an arresting bed as illustrated in FIG. 1, the line through points A and B in FIG. 7 represents a generalized 60/80 CGS, i.e., a CGS characterized by a compression strength changing from approximately 60 psi to approximately 80 psi over a 10 to 66 percent penetration range. The average, over this range is thus nominally equal to 70 psi at mid-point C. In FIG. 7, the line joining points A and B represents a typical generalized compressive strength gradient line for blocks of section 52 of FIG. 1. Lines D and E represent quality control limits and line F represents actual test data as recorded for a specific test sample of cellular concrete. In this example, a test sample for which test data over a 10 to 60 percent penetration range remains within quality control limit lines D and E, represents an arresting block fabricated within acceptable tolerances. FIG. 8 is a similar illustration of CGS characteristics of a test sample of a block suitable for use in section 54 of FIG. 1, having an 80/100 CGS which is nominally equal to 90 psi, when averaged over a selected depth of penetration (e.g., a 10 to 66 percent penetration range). For present purposes, "nominal" or "nominally" is defined as referring to a value or relationship which is within about plus or minus 15 percent of a stated value or relationship.

As shown, the FIG. 1 system further includes an inclined entrance ramp 56 positioned across the vehicle entrance front side of the first lateral row 52a. The ramp, which may be formed of asphalt mix or other permanent type material, tapers up to a height adjacent the blocks of row 52a, which is typically greater than the compressed height of the blocks of row 52a. In a particular embodiment, a ramp height of about 3 inches was used adjacent to 8 inch blocks having an estimated minimum compressed height of 1.8 inches. Ramp 56 is thus effective to gradually raise an aircraft above general runway level, so that the aircraft can enter the arresting bed on a relatively smooth basis as the wheels leave ramp 56 and begin compressing the blocks of row 52a.

Also included in the FIG. 1 system is a hardcoat layer 62, in the form of a relatively thin protective layer of cellular concrete material, overlaying the blocks of both section 52 and section 54 (represented by the uppermost boundary line of the bed in FIG. 1B). In FIG. 1A the hardcoat layer is represented as being transparent in order to show underlying details, even though the hardcoat layer will typically not be transparent. In a preferred embodiment, hardcoat layer 62 comprises a relatively thin layer of cellular concrete having a strength to support a pedestrian (e.g., sufficient to support a maintenance person walking on the arresting bed) and may be covered by a weather resistant paint or similar coating. Layer 62 is applied over the arresting bed after all blocks of sections 52 and 54 are positioned and appropriately adhered to supporting surface 50. Hardcoat layer 26 may typically be formed of 22 to 26 pcf dry density cellular concrete with an average thickness of about one inch. In an arresting bed which may include blocks ranging in thickness from 8 to 20 inches or more, the thickness of hardcoat layer 62 will typically not exceed 10 percent of average thickness or height of the blocks and may be closer to 5 percent. Since the thin hardcoat layer has relatively little effect on aircraft deceleration, test samples typically need not be subjected to testing as described above.

As illustrated, the arresting bed system also has associated with it a debris shield 58 and service vehicle entrance ramps 60. Shield 58 may be formed of relatively light weight aluminum sheet stock adequate to deflect particles blown by jet exhaust, etc., but fragile enough to readily yield to the tires of an aircraft. Ramps 60 are proportioned and constructed to enable airport fire or rescue vehicles to drive up onto the arresting bed in order to provide assistance to passengers of an aircraft which has come to a stop within the boundaries of the arresting bed. Ramps 60 may be constructed in a stepped form, of elongated blocks of cellular concrete of appropriate strength or other suitable material. As shown, ramps 60 are constructed of blocks of square cross-sectional dimensions able to be accommodated by a fire or rescue vehicle driving onto the bed.

In a typical arresting bed installation, appropriate for arresting travel of a variety of types of aircraft, the blocks of section 52 may typically have thicknesses varying in ¾ inch increments from 9 inches to 24 inches, a dry density of about 17 pcf, and provide a 60/80 CGS as described above. The blocks of section 54 may correspondingly have thicknesses varying in three inch increments from 24 inches to 30 inches, a dry density of about 19 pcf, and provide an 80/100 CGS. In fabrication of the blocks, the blocks of section 52 may be formulated from cellular concrete having a wet density toward the lower portion of a range of about 14 to 23 pcf, with the blocks of section 54 fabricated from cellular concrete having a wet density toward the upper portion of such range. The composite blocks in section 52/54 would correspondingly consist partially of 60/80 CGS material and partially of 80/100 CGS material. Overall, sections 52 and 54 may have an aggregate length of 400 feet, a width of 150 feet and front end and rear end thicknesses of 9 inches and 30 inches, respectively. It will be appreciated that for any particular implementation of the invention, performance achieved will be dependent upon the characteristics of the materials and arresting system design as specified and fabricated in order to meet identified site-specific performance objectives. Parameters relating to materials or systems for any specific implementation are beyond the scope of present purposes and specific values are discussed only as general examples of possible parameter magnitudes.

As described, the two major sections 52 and 54 can be constructed by contiguous assembly of preformed blocks which are then grouted or otherwise adhered to the support surface. Alternatively, other forms of construction may be employed in accordance with the invention. For example, with appropriate process control, an arresting bed similar to that illustrated can be poured and cured in place on a unitary or sectioned basis. Another form of construction is illustrated in FIG. 2 (comprising FIGS. 2A and 2B).

Referring now to FIGS. 2A and 2B, there is shown a portion of a vehicle arresting bed system in accordance with the invention, which includes a bed 90 formed of an aggregate including pieces of cellular concrete. For present purposes, and consistent with its dictionary definitions, "aggregate" is defined as a mass or volume of material formed of homogeneous or non-homogeneous units, pieces or fragments of the same or different sizes and of regular or irregular shapes. Pursuant to the invention, an aggregate as used in bed 90 may consist entirely of pieces of cellular concrete, typically having dimensions smaller than one-quarter of the average bed thickness, or may comprise pieces of cellular concrete with other material mixed in. Such other material may include pieces of phenolic foam or other compressible material, hollow glass spheres, hollow ceramic spheres, or other crushable items of selected material and shape. As shown, bed 90 has length, width and thickness and is configured to decelerate a vehicle, such as an aircraft, entering the bed from the left. More particularly, as represented in FIG. 2B, the aggregate of bed 90 is arranged to increase in thickness from left to right, so that some portions have different thickness than other portions. In addition, at 90a there is indicated a sloping portion of aggregate which may have a higher compressibility than the partially overlying aggregate portion to the left in FIG. 2B. The bed may thus include portions having different compressibility so that vehicle drag or deceleration increases as a vehicle travels through the bed.

The arresting bed system of FIGS. 2A and 2B includes edge members 92 and 94 along the perimeter of bed 90 to constrain the aggregate from spreading beyond the desired length and width of the bed. As illustrated, the edge members are blocks of cellular concrete similar to those described above and each having a suitable CGS. In FIG. 2A, each edge member 92 and 94 includes a row of blocks and the complete bed system would have a suitable overall length, with an additional row of blocks across the right hand end of the bed. The arresting bed system, as illustrated, also includes a stabilizing layer, represented by line 96 in FIG. 2B, overlaying the bed 90 to limit movement of the aggregate within the bed. Stabilizing layer 96 may typically be a relatively thin hardcoat layer of cellular concrete as described above. In FIG. 2A the stabilizing layer is represented as being transparent in order to show underlying details.

Figure 5:
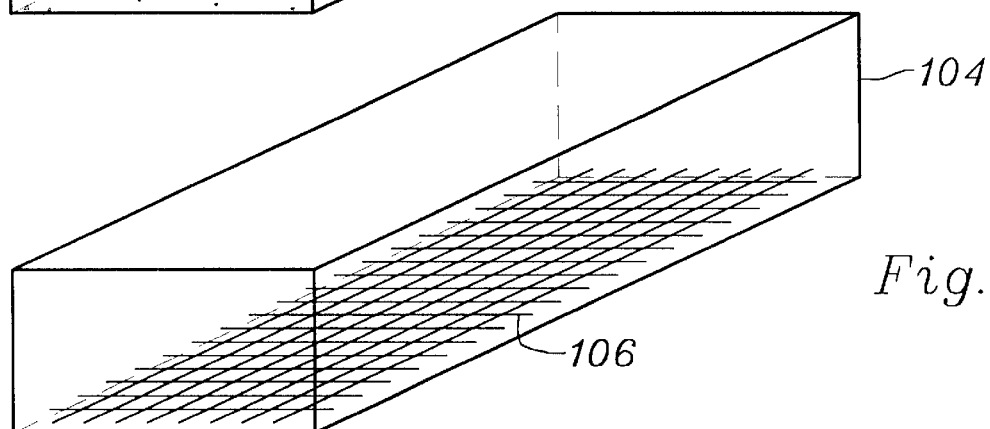
Figure 6:
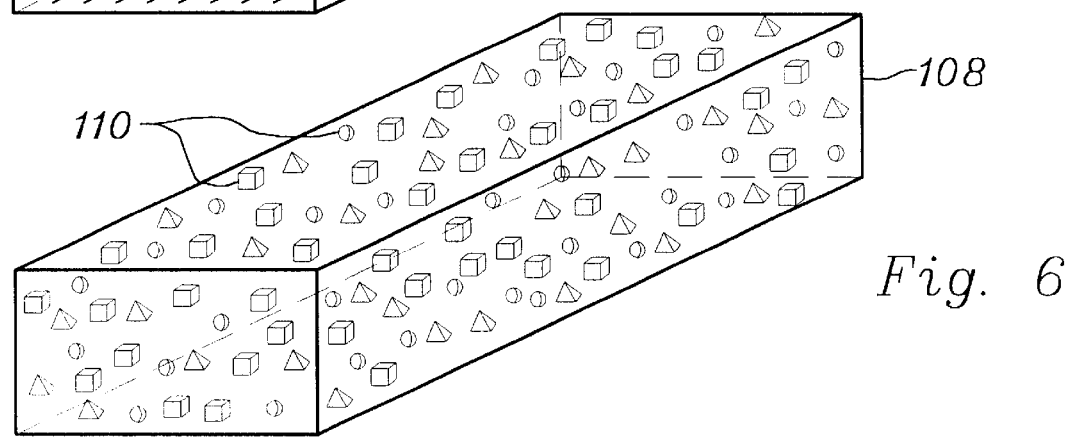

FIGS. 4, 5 and 6 illustrate particular embodiments of cellular concrete blocks usable in arresting bed systems pursuant to the invention. The block of FIG. 4 is a composite block including an upper portion 100 of cellular concrete having a desired CGS and a thin lower layer 102 of stronger cellular concrete or other material to provide added strength, particularly during block transport and installation. FIG. 5 shows a block of cellular concrete 104 which includes within its lower portion reinforcing members, illustrated as grid of suitable fiber, metal or other material. FIG. 6 illustrates a block 108 of cellular concrete containing within it crushable pieces or forms of other material. As represented in somewhat idealized form, such material may comprise one or more of: regular or irregular pieces of compressible material; glass or ceramic spheres; hollow items of selected material and shape; or other suitable pieces. Such items or materials will typically be positioned near the bottom or distributed through out the block and have minor effect in decelerating a vehicle, or be taken into account in determining CGS, or both.

The nature of a cellular concrete arresting bed system is such that its construction will inherently be relatively time consuming and expensive. Therefore, it is important that the method and information used to design the system be reliable enough to correlate with and predict performance under actual conditions of use. The use of a computerized modeling program, data obtained from appropriate test methodology, or both, can provide the necessary correlation between prediction and field results.

In general, to be effective a computer modeling program must be arranged to accept data as to aircraft weight, center of gravity, moment of inertia, landing gear structure and stress capacity and projected speeds at entry into the bed. The specifics of a selected bed geometry and material strength relative to the crushing of the arresting bed as the vehicle moves through are typically also inputs into the program. The program would then be configured to use that information to provide output data regarding deceleration versus distance and resulting loads on nose and main landing gear at different speeds.

The necessary material strength information for the program can be provided in one of two ways. First, actual test information using test methodology for samples of cellular concrete, can be used in the program. In this manner, the program accepts the material characteristics of a selected formulation of cellular concrete as fixed information and determines results based on that information. Alternatively, it can be assumed that the cellular concrete to be used will exhibit a certain characteristic drag force. Then, the designers of the arresting bed can use the above described testing methodology to identify cellular concrete formulas, processing techniques, and curing regimes that will result in materials that match the requirements for the design.

As an alternative to a comprehensive computer modeling program, arresting bed design can be more closely based on pro forma testing. Bed sections can be constructed for testing using cellular concrete of one or more compressive failure strengths. Aircraft, instrumented wheel structures or other compressive structures can then be driven into sample bed sections and resulting bed performance can then be determined and utilized in design of a complete arresting bed. Many other alternatives and variations will become apparent to skilled persons having an understanding of the invention. For example, beds or sections thereof may be of uniform or varying thickness, may have gradual or stepped thickness variation, may be of uniform or multiple CGS, may be of unitary or stacked blocks or aggregate, and may be of selected width and overall length, as suited for particular applications and use by particular aircraft or other vehicles.

While there have been described the currently preferred embodiments of the invention, those skilled in the art will recognize that other and further modifications may be made without departing from the invention and it is intended to claim all modifications and variations as fall within the scope of the invention.

What is claimed is:

1. A vehicle arresting bed system, comprising:
    a bed of cellular concrete having length, width and thickness and including first and second lateral rows of blocks of compressible cellular concrete, each block having a specified compressive gradient strength (CGS) characteristic representing a selected gradient of compressive strength with depth, over a depth of penetration from at least 10 to 60 percent of block thickness, the CGS characteristic selected to provide gradual deceleration of a vehicle entering said bed.

2. A vehicle arresting bed system as in claim 1, wherein blocks of said second lateral row have a greater thickness than blocks of said first lateral row.

3. A vehicle arresting bed system as in claim 1, wherein blocks of said first lateral row have a first CGS characteristic and blocks of said second lateral row have a second CGS characteristic which is higher than said first CGS characteristic.

4. A vehicle arresting bed system as in claim 3, wherein blocks of said second lateral row have a greater thickness than blocks of said first lateral row.

5. A vehicle arresting bed system as in claim 3, additionally including, between said first and second lateral rows, a lateral row of composite blocks each formed partially of compressible cellular concrete having said first CGS characteristic and partially of compressible cellular concrete having said second CGS characteristic.

6. A vehicle arresting bed system as in claim 1, wherein said first lateral row of blocks has a dry density nominally equal to 17 pcf and said second lateral row of blocks has a dry density nominally equal to 19 pcf.

7. A vehicle arresting bed system as in claim 1, wherein blocks of said first lateral row have a 60/80 CGS characteristic nominally equal to 70 psi and blocks of said second lateral row have an 80/100 CGS characteristic nominally equal to 90 psi, when averaged over said depth of penetration within said respective blocks.

8. A vehicle arresting bed system as in claim 1, wherein said bed includes blocks having a 60/80 CGS characteristic nominally equal to 70 psi, when averaged over said depth of penetration of said blocks.

9. A vehicle arresting bed system as in claim 1, wherein said bed includes blocks having a 80/100 CGS characteristic nominally equal to 90 psi, when averaged over said depth of penetration of said blocks.

10. A vehicle arresting bed system as in claim 1, wherein said bed consists of blocks having a dry density in a range of 12 to 22 pcf.

11. A vehicle arresting bed system as in claim 1, wherein said bed consists of blocks formed of cellular concrete having a wet density in a range of 14 to 23 pcf cured in forms of predetermined sizes.

12. A vehicle arresting bed system as in claim 1, wherein said bed includes blocks of compressible cellular concrete having embedded therein compressible pieces of a material other than cellular concrete.

13. A vehicle arresting bed system as in claim 1, wherein said bed includes blocks of compressible cellular concrete having embedded therein one of: hollow glass spheres; hollow ceramic spheres; hollow items of selected material and shape.

14. A vehicle arresting bed as in claim 1, wherein said bed includes blocks of compressible cellular concrete which include a lower layer of higher strength material positioned so as not to interfere with compressive failure of said blocks to a depth of penetration of at least 60 percent of block thickness.

15. A vehicle arresting bed as in claim 1, wherein said bed includes blocks of compressible cellular concrete having reinforcing members of material other than cellular concrete embedded in the lower portions thereof so as not to interfere with compressive failure of said blocks to a depth of penetration of at least 60 percent of block thickness.

16. A vehicle arresting bed as in claim 15, wherein said reinforcing members comprise a grid.

17. A vehicle arresting bed system comprising:
    a bed formed of an aggregate, said bed having length, width and thickness and configured to decelerate a vehicle entering said bed; and
    edge members, formed of blocks of compressible cellular concrete, positioned along the perimeter of said bed to constrain said aggregate from spreading beyond said length and width;

said edge members having a specified compressive gradient strength (CGS) characteristic representing a selected gradient of compressive strength with depth, permitting compression thereof by a vehicle entering said bed.

18. A vehicle arresting bed system as in claim 17, additionally comprising:

a stabilizing layer overlaying said bed to limit movement of said aggregate within said bed.

19. A vehicle arresting bed system as in claim 17, wherein said aggregate comprises pieces characterized by one of: irregular size and shape; common size and shape; varied size and shape.

20. A vehicle arresting bed system as in claim 17, wherein said aggregate includes compressible pieces of a material other than cellular concrete.

21. A vehicle arresting bed system as in claim 17, wherein said aggregate includes one of: hollow glass spheres; hollow ceramic spheres; hollow items of selected material and shape.

22. A vehicle arresting bed system as in claim 17, wherein said bed has a different thickness in different portions of the bed.

23. A vehicle arresting bed system as in claim 17, wherein said aggregate includes pieces of cellular concrete having different compressibility in different portions of said bed.

24. A vehicle arresting bed system as in claim 17, wherein said aggregate is replaced by poured in place cellular concrete of a specified CGS characteristic.

25. A vehicle arresting unit, for use in a vehicle arresting bed system, comprising:

a three-dimensional block of compressible cellular concrete having a combination of thickness and a specified compressive gradient strength (CGS) characteristic representing a selected gradient of compressive strength with depth, over a depth of penetration from at least 10 to 60 percent of said thickness, the specified CGS characteristic effective to provide limited deceleration of a vehicle wheel, said block comprising cellular concrete having a dry density in a range from 12 to 22 pcf.

26. A vehicle arresting unit as in claim 25, wherein said three-dimensional block has a 60/80 CGS characteristic nominally equal to 70 psi, when averaged over said depth of penetration of the block.

27. A vehicle arresting unit as in claim 25, wherein said three-dimensional block has an 80/100 CGS characteristic nominally equal to 90 psi, when averaged over said depth of penetration of the block.

28. A vehicle arresting unit as in claim 25, wherein said three-dimensional block is formed from a combination including:

a foam prepared from water and a foaming agent; and a slurry of water and cement which has undergone a hydration related temperature rise to reach a slurry temperature not exceeding 89 degrees F., prior to admixture with said foam.

29. A vehicle arresting unit as in claim 28, wherein said three-dimensional block is formed using a slurry which has undergone a hydration related temperature rise in a range of 5 to 12 degrees F., prior to admixture with said foam.

30. A vehicle arresting unit as in claim 28, wherein said three-dimensional block is formed using a slurry which has been projected in a stream to produce shearing forces prior to admixture with said foam.

31. An arresting unit comprising:

a deceleration block fabricated to provide non-rebound limited deceleration of an object, said block comprising compressible cellular concrete having a specified compressive gradient strength (CGS) characteristic representing a selected gradient of compressive strength with depth, over a depth of penetration from at least 10 to 60 percent of block thickness;

said deceleration block including a first layer of compressible cellular concrete having a first CGS characteristic and a second layer of compressible cellular concrete having a higher CGS characteristic.

32. An arresting unit as in claim 31, said block additionally including at least two transverse slots to facilitate non-destructive lifting of said block.

33. An arresting unit as in claim 31, wherein said block has a dry density in a range of 12 to 22 pcf.

34. An arresting unit as in claim 31, wherein said arresting unit additionally comprises crushable pieces of a material other than cellular concrete embedded in said block.

35. An arresting unit as in claim 31, wherein said arresting unit additionally comprises a layer of higher strength material to increase structural stability of said block, said layer positioned in the lower portion of said block so as not to interfere with compressive failure of the block to a depth of penetration of at least 60 percent of block thickness.

36. An arresting unit as in claim 31, wherein said arresting unit additionally comprises one or more reinforcing members embedded in said block, said reinforcing members positioned in the lower portion of said block so as not to interfere with compressive failure of the block to a depth of penetration of at least 60 percent of block thickness.

37. An arresting unit as in claim 36, wherein said reinforcing members comprise a grid of one of: wires; rods; fibers.

38. For use in a vehicle arresting bed system, an arresting unit in the form of a three-dimensional block of compressible cellular concrete having a specified compressive gradient strength (CGS) characteristic representing a selected gradient of compressive strength with depth, over a depth of penetration from at least 10 to 60 percent of block thickness, the arresting unit produced by a method comprising the steps of:

(a) forming a slurry of cement and water;

(b) permitting said slurry to undergo a hydration related temperature rise;

(c) preparing a foam from water and a foaming agent;

(d) admixing said slurry and said foam to provide cellular concrete; and (e) curing a portion of said cellular concrete to provide a block of shape and size suitable for use in decelerating a moving object.

39. An arresting unit as in claim 38, wherein step (a) includes projecting said slurry in a stream to induce high-shear mixing.

40. An arresting unit as in claim 38, wherein in step (b) said slurry undergoes a hydration related temperature rise in a range of 5 to 12 degrees F.

41. An arresting unit as in claim 38, wherein in step (d) said cellular concrete has a wet density in a range of 14 to 23 pcf.

42. An arresting unit as in claim 38, wherein in step (e) said cellular concrete is cured and after curing has a dry density of 12 to 22 pcf.

43. An arresting unit as in claim 38, wherein step (b) comprises:

(b) permitting said slurry to undergo a hydration related temperature rise to reach a slurry temperature not exceeding 89 degrees F.

* * * * *